Patented Dec. 7, 1948

2,455,880

UNITED STATES PATENT OFFICE 2,455,880

LEAD SILANOLATE STABILIZERS FOR VINYL HALIDE RESINS

Moyer M. Safford and Edwin L. Mincher, Schenectady, N. Y., assignors to General Electric Company, a corporation of New York No Drawing. Application May 13, 1946, Serial No. 669,470

12 Claims. (Cl. 260—86)

The present invention relates to vinyl resins and more particularly to vinyl resins stabilized against the action of heat and light.

Boadly, our invention relates to the heat and light stabilization of resinous compositions produced by polymerizing compositions comprising a vinyl halide with or without other copolymerizable compounds. Among such compositions are (1) the polyvinyl halides, such as, for example, polyvinyl chloride (including the different molecular weight forms, e. g., gamma-polyvinyl chloride), polyvinyl bromide, etc.; (2) vinyl resins produced by the conjoint polymerization of a vinyl halide, e. g., vinyl chloride, and a vinyl ester of a lower saturated aliphatic monocarboxylic acid, e. g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., it being obvious from the foregoing examples that the term "lower saturated aliphatic monocarboxylic acid" embraces ones containing at most six carbon atoms; (3) vinyl resins produced by the conjoint polymerization of a vinyl halide and an acrylic compound, e. g., the copolymers of vinyl chloride with, for example, ethyl methacrylate, methyl methacrylate, benzyl or chlorobenzyl acrylate, methyl chloroacrylate, etc.; (4) copolymers of a vinyl halide, e. g., vinyl chloride, and a vinylidene halide, e. g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be stabilized with these lead hydrogen-substituted silanolates may be found in e. g., D'Alelio Patents 2,378,753, issued June 19, 1945, and 2,299,740, issued October 27, 1942, both of which are assigned to the same assignee as the present invention.

We have found that compounds represented by the general formula

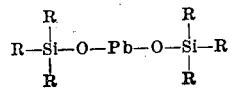

where R is a monovalent hydrocarbon radical selected from the class consisting of alkyl, aryl, aralkyl and alkaryl radicals are excellent heat and light stabilizers for vinyl resins. Illustrative examples of the monovalent hydrocarbons which R may represent are alkyl radicals, e. g., methyl, ethyl, propyl, isopropyl, butyl, amyl, etc.; aryl radicals, e. g., phenyl, naphthyl, etc.; alkaryl radicals, e. g., ethylphenyl, tolyl, etc.; and aralkyl radicals, e. g., benzyl, phenylethyl, etc. Preferably R is a lower alkyl group, more particularly a methyl group.

The chemical compounds employed as heat and light stabilizers for the vinyl resins may be prepared by various methods. One method as illustrated, for example in the preparation of lead trimethylsilanolate, comprises preparing trimethylsilanol from dimethyl silicone in the manner disclosed by R. O. Sauer in J. Am. Chem. Soc., vol. 66, page 1708 (1944). The trimethylsilanol is thereafter reacted with lead oxide (litharge) in the manner disclosed by Winton I. Patnode and F. C. Schmidt in the J. Am. Chem. Soc., vol. 67, page 2272 (1945), to yield the lead trimethylsilanolate.

In order that those skilled in the art may better understand how the present invention may be practiced, the following examples are given by way of illustration and not by way of limitation. All parts are by weight.

EXAMPLE 1

In this example lead trimethylsilanolate was prepared as follows:

Trimethylsilanol was made in accordance with the method disclosed by R. O. Sauer (supra). The ether trimethylsilanol solution (identified as solution B in the aforementioned article) obtained by this method was dried over anhydrous sodium carbonate for about 15 hours. Assuming the presence of about 30 parts, by weight, of trimethylsilanol in the ether solution, about 15 parts PbO which had been oven-dried at 100° C. for one hour was added. The reaction vessel containing the ingredients was shaken constantly for several days and then kept in a refrigerator at about 0° C. for several more days. The ether solution was carefully removed from the mixture so that the excess PbO on the bottom of the reaction vessel was not disturbed. The ether and excess trimethylsilanol were evaporated from the ether solution, leaving a fine, white, powdery deposit, which was identified as lead trimethylsilanolate. This powder was further dried under a vacuum. Lead trimethylsilanolate is a white, crystalline solid soluble in organic solvents, such as ether, toluene, tricresyl phosphate, and absolute alcohol. The decomposition point of the pure lead trimethylsilanolate is approximately 180° C.

EXAMPLE 2

|  | Parts | |
| --- | --- | --- |
|  | Sample 1 | Sample 2 |
| Polyvinyl chloride | 60 | 60 |
| Lead trimethylsilanolate | 1 | 2 |
| Tricresyl phosphate | 39 | 38 |

The above components of each sample were milled for about 10 minutes on differential rolls, the front roll of which was heated with steam under a pressure of about 20 to 30 lbs. per sq. in. The compound after milling was then molded for about 5 minutes at a temperature of 150° C. under a pressure of 500 lbs. per sq. in. The sample obtained in each case, which was very pale yellow in color, was divided into four equal parts. Each part was heat-aged at 150° C. for periods of time varying from 15 to 60 minutes, and the effect of this heat-aging noted. As a control, another sample of 60 parts polyvinyl chloride was compounded with 40 parts tricresyl phosphate, omitting the stabilizer in this case. This sample also was pressed under the same conditions disclosed above and divided into four equal portions which were heat-aged for the same length of time and under the same conditions as those described above for the samples containing stabilizer. Although the stabilized samples were a very pale yellow in color after the molding cycle, the unstabilized sample was a slight pinkish yellow, indicating that decomposition was already beginning to take place. The following table shows the results of these heat-aging tests.

Table I

| Time | Stabilized | | Unstabilized |
| --- | --- | --- | --- |
|  | Sample 1 | Sample 2 |  |
| 15 min | Pale yellow | Very pale yellow | Pinkish yellow. |
| 30 min | do | Pale yellow | Light reddish yellow. |
| 45 min | Light yellow | do | Do. |
| 60 min | Light amber | Light yellow | Dark amber. |

From the foregoing examples it will be apparent that vinyl resins employing the lead stabilizers disclosed previously are able to maintain their light color despite the fact that they were heated at temperatures which caused the unstabilized materials to darken and decompose. Moreover, the fact that the decomposition of the vinyl resin can be substantially prevented means that better electrical properties can be maintained over wider temperature ranges.

Although in the above examples from about 1.7 to 3.3 per cent stabilizer by weight, based on the amount of the vinyl resin, has been employed, we do not intend to be limited to such ranges. Thus, we may use, for example, from about 0.5 to 5 or 10 per cent stabilizer, by weight, based on the amount of the vinyl resin. Although amounts in excess of 10 per cent may be employed, for economical reasons I prefer not to use larger amounts.

It will be understood, of course, by those skilled in the art that our invention is not limited to the stabilization of polymers or copolymers of a vinyl halide by the particular lead salt disclosed in the foregoing example. Instead of using the stabilizer disclosed above, we may employ other lead hydrocarbon-substituted silanolates of the type defined hereinbefore. Examples of such compounds are lead triethylsilanolate, lead triphenylsilanolate, lead tributylsilanolate, lead methyldiethylsilanolate, lead ethyldimethylsilanolate, lead triphenylsilanolate, lead phenyldimethylsilanolate, lead tritolylsilanolate, lead tribenzylsilanolate, etc.

The above compounds may be readily prepared by the method previously disclosed herein by using the corresponding hydrocarbon-substituted silanol in place of the trimethylsilanol employed in the foregoing example and thereafter effecting reaction between the said hydrocarbon-substituted silanol and lead oxide.

In the compounding of plastic compositions for various uses, there may be included any of the common solvents, plasticizers, for examples, dioctyl phthalate, dibutyl phthalate, etc., pigments and other modifying materials without detrimental effect upon the heat, light and electrical stability afforded by these new stabilizers.

Various means well known to the art may be used for incorporating the stabilizers of this invention into the resinous compositions, among these being the one disclosed in the foregoing example wherein sheeting on differential rolls was employed.

The stabilized vinyl halide polymers and copolymers of this invention may be used not only for compression, extrusion and injection molding compounds, but also for the preparation of insulated electrical cables either by taping, extrusion or other methods used in the art. They also may be employed in the production of varnishes, adhesives, castings, laminated products, etc.

It is to be understood that copolymers of a vinyl halide with other polymerizable materials, for example, vinyl acetate, may also be stabilized in accordance with our invention. For example, compositions comprising the product of conjoint polymerization of a mixture comprising vinyl chloride and a polymerizable vinyl ester, for instance, vinyl acetate, may be stabilized with these lead hydrocarbon-substituted silanolates. More particularly we may use, for example, copolymers in which the vinyl halide comprises, by weight, about 85 per cent of the total weight of the polymerazable materials. However, we may use other copolymers in which the vinyl halide is present in lower concentrations, for example, from 40 to 70 percent by weight, or higher concentrations, for instance, as high as 98 per cent by weight. For maximum strength and flame-resisting properties, we prefer that the vinyl halide used in preparing the copolymer be present in the copolymer in an amount equal to, by weight, at least 60 per cent, preferably 80 per cent, of the total weight of the copolymerizable ingredients.

It will be apparent that the compounds employed as stabilizers in our invention may also be used to stabilize other halogen-containing resinous and rubber-like products, for instance polyvinylidene halides and copolymers thereof (e. g., polyvinylidene chloride and copolymers thereof), neoprene, and the like, wherein free hydrogen halide may be liberated in the product under the influence of heat-aging.

What we claim as new and desire to secure by Letters Patent of the United States is:

1. A composition comprising (1) a vinyl halide resin and (2) from 0.5 to 10 per cent, by weight, based on the weight of (1) of a heat and light stabilizer therefor comprising a compound having the general formula

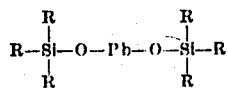

where R is a hydrocarbon radical selected from the class consisting of alkyl, aryl, aralkyl and alkaryl radicals.

2. A composition as in claim 1 wherein R is an alkyl radical.

3. A composition as in claim 1 wherein R is a methyl radical.

4. A composition as in claim 1 wherein R is a phenyl radical.

5. A composition comprising a polymeric mass including (1) polyvinyl chloride, and as a heat and light stabilizer therefor, (2) from 0.5 to 10 per cent, by weight, based on the weight of (1) of a compound having the same formula as set forth under (2) of claim 1.

6. A composition comprising (1) a product of conjoint polymerization of a mixture containing a vinyl halide and a polymerizable vinyl ester of a lower saturated aliphatic monocarboxylic acid containing at most six carbon atoms and (2) a heat and light stabilizer therefor comprising from 0.5 to 10 per cent, by weight, based on the weight of (1) of a compound having the same formula as set forth under (2) of claim 1.

7. A composition as in claim 6 wherein the vinyl ester is vinyl acetate.

8. A composition comprising (1) a vinyl halide resin and (2) a heat and light stabilizer for (1) comprising from 0.5 to 10 per cent, by weight, based on the weight of (1) of lead trimethylsilanolate.

9. A composition comprising (1) a copolymer obtained by the conjoint polymerization of a mixture comprising, by weight, a major portion of vinyl chloride and a minor portion of a vinyl ester of a lower saturated aliphatic monocarboxylic acid containing at most six carbon atoms and (2) from 0.5 to 10 per cent, by weight, based on the weight of (1) of lead trimethylsilanolate.

10. A composition as in claim 9 wherein the vinyl ester is vinyl acetate.

11. A composition comprising (1) a copolymer obtained by the conjoint polymerization of a mixture comprising, by weight, a major portion of vinyl chloride and a minor portion of vinyl acetate and (2) from 0.5 to 5 per cent, by weight, based on the weight of (1) of lead trimethylsilanolate.

12. A composition comprising (1) polyvinyl chloride and (2) a heat and light stabilizer for (1) containing from 0.5 to 5 per cent, by weight, based on the weight of (1) of lead trimethylsilanolate.

MOYER M. SAFFORD.
EDWIN L. MINCHER.

No references cited.